(12) United States Patent
Martin (10) Patent No.: US 7,996,356 B2
(45) Date of Patent: Aug. 9, 2011

(54) TEXT SEARCHING AND CATEGORIZATION TOOLS

(75) Inventor: Nathaniel G. Martin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 575 days.

(21) Appl. No.: 11/088,513

(22) Filed: Mar. 24, 2005

(65) Prior Publication Data

US 2006/0218105 A1 Sep. 28, 2006

(51) Int. Cl.
*G06F 7/00* (2006.01)
(52) U.S. Cl. .................... 707/603; 707/765; 707/776
(58) Field of Classification Search .................. None
See application file for complete search history.

(56) References Cited

U.S. PATENT DOCUMENTS

| | | | |
|---|---|---|---|
| 4,891,766 A * | 1/1990 | Derr et al. | 706/60 |
| 5,442,778 A | 8/1995 | Pedersen et al. | |
| 5,787,422 A | 7/1998 | Tukey et al. | |
| 5,819,259 A * | 10/1998 | Duke-Moran et al. | 707/3 |
| 5,841,900 A | 11/1998 | Rahgozar et al. | |
| 5,895,470 A | 4/1999 | Pirolli et al. | |
| 6,308,149 B1 | 10/2001 | Gaussier et al. | |
| 6,442,545 B1 * | 8/2002 | Feldman et al. | 707/6 |
| 6,697,998 B1 * | 2/2004 | Damerau et al. | 715/512 |
| 7,103,607 B1 * | 9/2006 | Kirkwood et al. | 707/3 |
| 7,346,490 B2 * | 3/2008 | Fass et al. | 704/7 |
| 7,363,305 B2 * | 4/2008 | Gabbert et al. | 707/608 |
| 2006/0053098 A1 * | 3/2006 | Gardner et al. | 707/3 |

OTHER PUBLICATIONS

Larry Compton, "The Search for Machine-Aided . . . ", www.dataharmony.com/papers/article_012203.htm, pp. 1-7, 2002-2005.
Hugh McKellar, "Shaking up Content Categorization", KMWorld Magazine Archives, pp. 1-2, Sep. 2001.
www.dataharmony.com/products/htm (downloaded Mar. 24, 2005), pp. 1-4, 2002-2005.
http://www.teragram.com/index.htm, "Practical Solutions to Monstrous Amounts of Info.", pp. 1-2, (downloaded Mar. 24, 2005).
http://www.teragram.com/Solutions/categorizer.htm, "Teragram Categorizer", pp. 1-3, 1997-2003 (downloaded Mar. 24, 2005).
NVivo or N6? Comparison Tables, http://www.qsinternational.com/products/productoverview/comparison%20table.pdf, pp. 1-6 (downloaded Mar. 24, 2005).
www.aprsmartlogik.com, pp. 1-2, (downloaded Mar. 24, 2005).
J.R. Fisher, "Prolog :—tutorial, Introduction", www.csupomona.edu/~jrfisher/www/prolog_tutorial/intro.html, pp. 1-2, 1999-2004 (downloaded Mar. 24, 2005).

* cited by examiner

*Primary Examiner* — Christyann R Pulliam
(74) *Attorney, Agent, or Firm* — Miele Law Group PC (57) ABSTRACT

A disclosed process accesses text data that is to be mined. The text data includes text snippets. Rules are encoded in a rule base. A search request is submitted to a search request handler. A search request handler applies the rules from the rule base to the text and associates different labels to respective text snippets in the text data in accordance with the rule base.

21 Claims, 8 Drawing Sheets

APPLY CORRESPONDING LABEL TO TEXT SNIPPET
IF THERE IS A MATCH.

MATCH IF TEXT CONTAINS:

{ TERM 1 / SYNONYM
AND
TERM 2 / SYNONYM

.
.
.

TERM N / SYNONYM }

AND IF TEXT CONTAINS NONE OF:

{ NEG. TERM 1 / SYNONYM
AND
NEG. TERM 2 / SYNONYM

.
.
.

NEG. TERM M / SYNONYM }

MODIFIED TEXT SNIPPET

|   | A | B | C | D | E | F | ... |
|---|---|---|---|---|---|---|---|
| 1 | Monday | Tuesday | Wednesday | Thursday | Friday | Saturday | |
| 2 | Saturday | Sunday | | | | | |
| 3 | accommodating | accommodate | | | | | |
| 4 | efficiency | efficient | | | | | |
| 5 | professionally | professional | professionalism | | | | |
| 6 | can do | can-do | | | | | |
| 7 | | | | | | | |
| ... | | | | | | | |

FIG. 7

Example: Customer Support Log
100. Getting web motion faults. This is a new web. The old web was stalling and also getting these faults. The new web had no problems for a week, then the 10-3180 started. The CSE had questions on the bulletin about the intermittent ribbon cable connections. The CSE has marked the web and saw it was not advancing.

Example: Customer Verbatim Log
I delivered the 4th quarter BCCR packages for copying on Monday, Sept. 29 first thing in the morning. This consists of the approx. 85 pages which I just needed photocopied with no holes, stapling, each copy separated by a colored piece of paper. That I provided.

FIG. 8

TEXT SEARCHING AND CATEGORIZATION TOOLS

BACKGROUND

Certain aspects of the disclosure relate to computer assisted tools for searching, analyzing, or categorizing text data.

In various different contexts, humans will analyze short snippets of text in order to extract meaning from the text and categorize the text. These snippets of text contain significant amounts of information. Such text snippets may be found, for example, in requirements documents, field service logs, and customer verbatims. Requirements documents might include textual functional requirements of a particular product being developed. Field service logs might include log entries in a textual form, related to the servicing of a given product. The entries may be provided by the customer or by a service technician. Customer verbatims may be customer responses to emails sent to the customers. The emails might ask the customers to click on a link provided in the email to allow the customer to enter information online.

As noted above, these text snippets are analyzed by a human, who may be an expert in the subject matter discussed in the text snippets. Such a human may be called a "subject matter expert." The human extracts meaning from the text, and categorizes the text. The categories can then be analyzed with statistical techniques, or can they can be used to focus attention on certain aspects of the snippets.

BRIEF SUMMARY OF THE DISCLOSURE

In one embodiment, a method is carried out. Text data to be mined is accessed. The text data includes text snippets. Rules are encoded in a rule base. A search request is submitted to a search request handler. The search request handler applies the rules from the rule base to the text, and associates different labels to respective text snippets in the text data in accordance with the rule base.

BRIEF DESCRIPTION OF THE DRAWINGS

Embodiments are described in the detailed description as follows, by reference to the noted drawings, in which like reference numerals represent similar parts throughout the several views of the drawings, and wherein.

DETAILED DESCRIPTION

Figure 1:
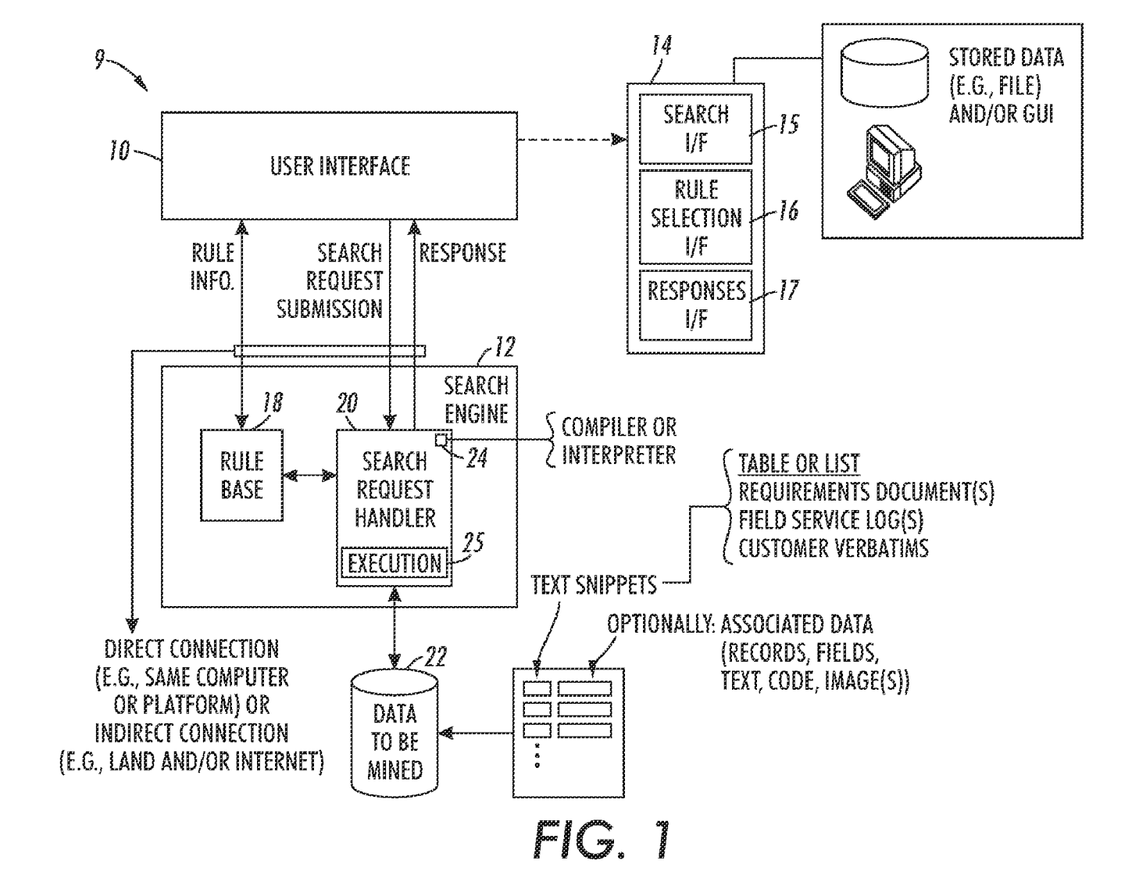
FIG. 1 is a block diagram of a text analysis system.

FIG. 1 is a block diagram of a text analysis system 9. The illustrated system 9 includes a user interface 10 coupled to a search engine 12. Search engine 12 may be configured to perform one or both of text analysis, analyzing textual data from data to be mined, and text retrieval, retrieving specific text sought after by a user. User interface 10 includes a plurality of interfaces 14, including a search interface 15, a rule selection interface 16 and responses interface 17. Each of the illustrated interfaces 15, 16, and 17 may be in the form of stored data (for example, in a file) and/or a graphical user interface.

Search engine 12, in the illustrated embodiment, includes a rule base 18 and a search request handler 20. Search request handler 20 accesses text data to be mined which is stored in a database 22. In the illustrated embodiment, the text data to be mined, in database 22, includes a plural set of text snippets. The text snippets may be in a form of a table or list. Examples of text snippets that may be in the database include requirements documents, field service logs, or customer verbatims. Database 22 may optionally also include associated data, associated with each of the text snippets. That associated data may include one or more records, fields, text, code, and one or more images.

In embodiments, a text snippet refers for example to a small string of text, generally on the order of less than fifty words. Text snippets may include parts or fragments of a larger text block. Data mining refers for example to sorting through data or analyzing data to identify patterns and relationships from the data. In embodiments, data to be mined refers for example to the data to be sorted through. Text snippets are for example a type of data to be mined.

User interface 10 may be part of an individual workstation, or a platform that includes one computer or a plurality of computers. User interface 10 may include an individual computer workstation running an application program such as MICROSOFT® EXCEL™, MICROSOFT® ACCESS™, or a web browser. A counterpart portion of user interface 10 may be provided in a separate computer to carry out certain functions of user interface 10. For example, user interface 10 may include both a web browser client and a web page server on a separate machine.

The connection between user interface 10 and search engine 12 may be a direct connection, for example, if they are both on the same computer or platform. Alternatively, it may be an indirect connection, for example, via a local area network (LAN) and/or the Internet. Search engine 12 includes a rule base 18 and a search request handler 20. Search request handler 20 includes a compiler or an interpreter 24. Compiler or interpreter 24 is responsive to rules in rule base 18. An execution mechanism 25 executes the rules as interpreted or compiled. The rules in rule base 18 are encoded to include a label and a corresponding set of match terms. When a rule is executed, a mined text snippet containing at least one term in a given set of match terms (or containing each of the terms in the given set of match terms per the illustrated embodiment) is associated with the label corresponding to the given set of match terms. A rule in the rule base may be encoded to also include a corresponding set of negation terms, where, when the rule is executed, a mined text snippet containing at least one negation term is not to be associated with the label corresponding to that set of negation terms.

Each term, of the sets of match terms and the sets of negation terms, includes a string of characters. The mined text snippet contains a term when it contains a string of characters matching the term's string of characters.

Figure 2:
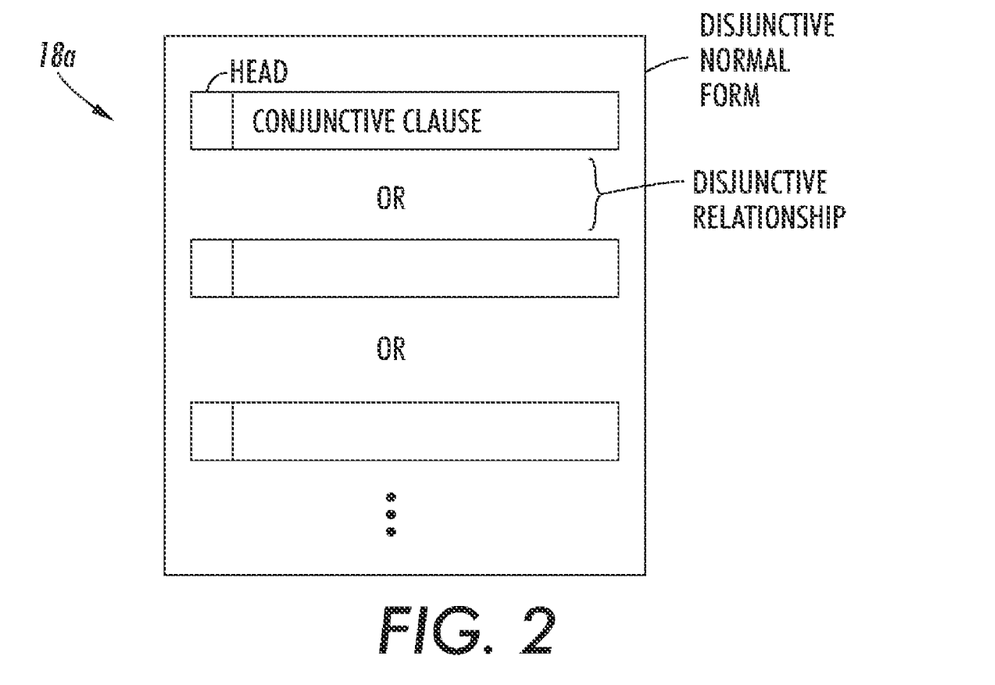
FIG. 2 is a schematic block diagram of a first type of rule base 18*a*.

FIG. 2 is a schematic block diagram of one type of rule base 18*a*. In the illustrated structure, rule base 18*a* is in a disjunctive normal form (DNF), and includes a plural set of conjunctive clauses. Each conjunctive clause has a corresponding associated head. Each head includes a textual label, and its conjunctive clause represents a pairing or grouping of term values. Each term value contains a string of characters, and possibly, also contains one or more symbols in the place of particular characters to allow for varied terms in the text snippets to be a match to the value.

A conjunctive clause may be deemed a connect operation; for example, it may be an AND clause. A disjunctive relationship is an operation presenting alternatives; for example, it may be an OR clause.

The term values may be joined by AND statements. Each conjunctive clause and its associated head is joined with a disjunctive relationship to others in rule base 18a. In the illustrated embodiment, the disjunctive relationships between the conjunctive clauses are OR relationships.

In the embodiment shown in FIG. 2, the rule base is in its disjunctive normal form, in which each conjunctive clause is written on a line with a disjunctive relationship between the lines. Text snippets that match multiple conjunctive clauses within the rule base 18a can be labeled with all of the matching labels, or they can be labeled with just the first matching label. Matching is done on character-by-character basis, so that partial words can be matched.

Figure 3:
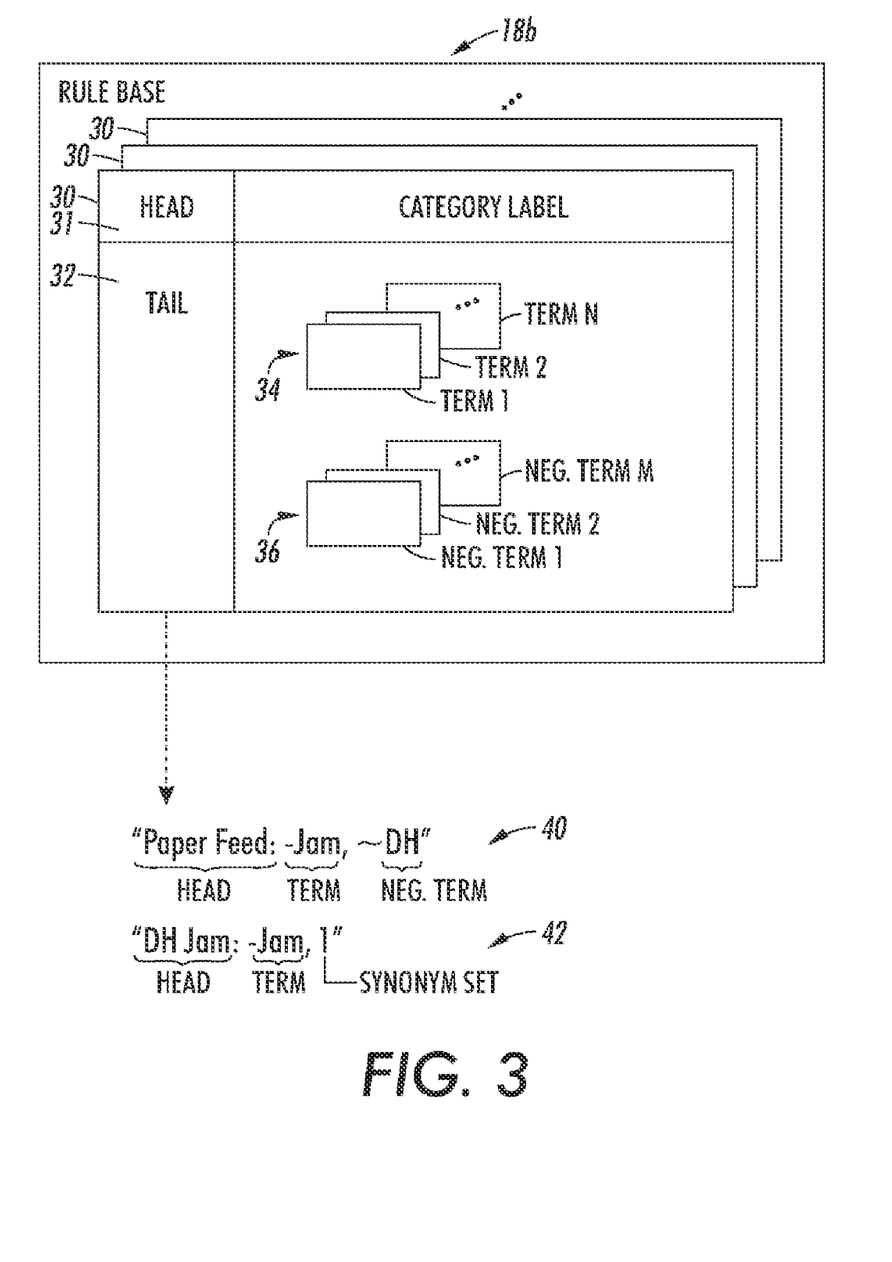
FIG. 3 is a schematic block diagram of a second type of rule base 18*b*.

FIG. 3 is a schematic block diagram of a different rule base 18b. In that embodiment, rule base 18b includes a plural set of rules 30. Each rule 30 includes a head 31 and a tail 32. A head 31 includes a label, and a tail 32 includes a corresponding set of match terms 34 and a corresponding set of negation terms 36. In the illustrated embodiment, the corresponding set of match terms 34 includes term 1, term 2, . . . , term N, and the corresponding set of negation terms 36 includes negation term 1, negation term 2, . . . , negation term M.

Each of the terms, whether they be match terms or negation terms, includes a string of characters. A mined text snippet is deemed to contain a term when it contains a string of characters matching the term's string of characters. Each of the terms may be further associated with a corresponding set of synonyms. A mined text snippet may further be deemed to contain a term when it contains a string of characters matching the term's string of characters or its corresponding synonym's string of characters. Slight variations between the text snippet and the term may be allowed by the use of wild card symbols such as a question mark, an apostrophe, and so on.

Rules 30 in rules base 18b may be specified or embodied in the form of a textual language using a prescribed syntax. The syntax may be in the form of "label:-match term, ~negation term". Examples of statements using this syntax, provided in FIG. 3, include a first statement 40 and a second statement 42.

In the illustrated example shown in FIG. 3, first statement 40 is "Paper Feed:-Jam, ~DH", and second statement 42 is "DH Jam: - Jam, 1". The colon and dash indicate a demarcation between a head preceding the colon and the terms succeeding the colon. The tilde precedes each negation term. A synonym set may be represented by a number following a comma which immediately follows the term for which the synonym set corresponds. Accordingly, in statement 42, a synonym set is identified by the number 1 which identifies the synonym set that supplies the second term in the disjunctive clause.

When applying the first rule to a text snippet, if the text snippet includes the term "Jam," and does not include the term "DH", it will be given the label "Paper Feed". Applying the second rule to a text snippet, if the text snippet has the term "Jam" or any one of the terms in the synonym set identified by the number 1, that text snippet is given the label "DH Jam". For example, if the synonym set corresponding to the number 1 includes {DH, DOC Handler, Document Handler}, the label "DH Jam" will be applied if any of the strings in the synonym set appear in the text snippet.

Figure 4:
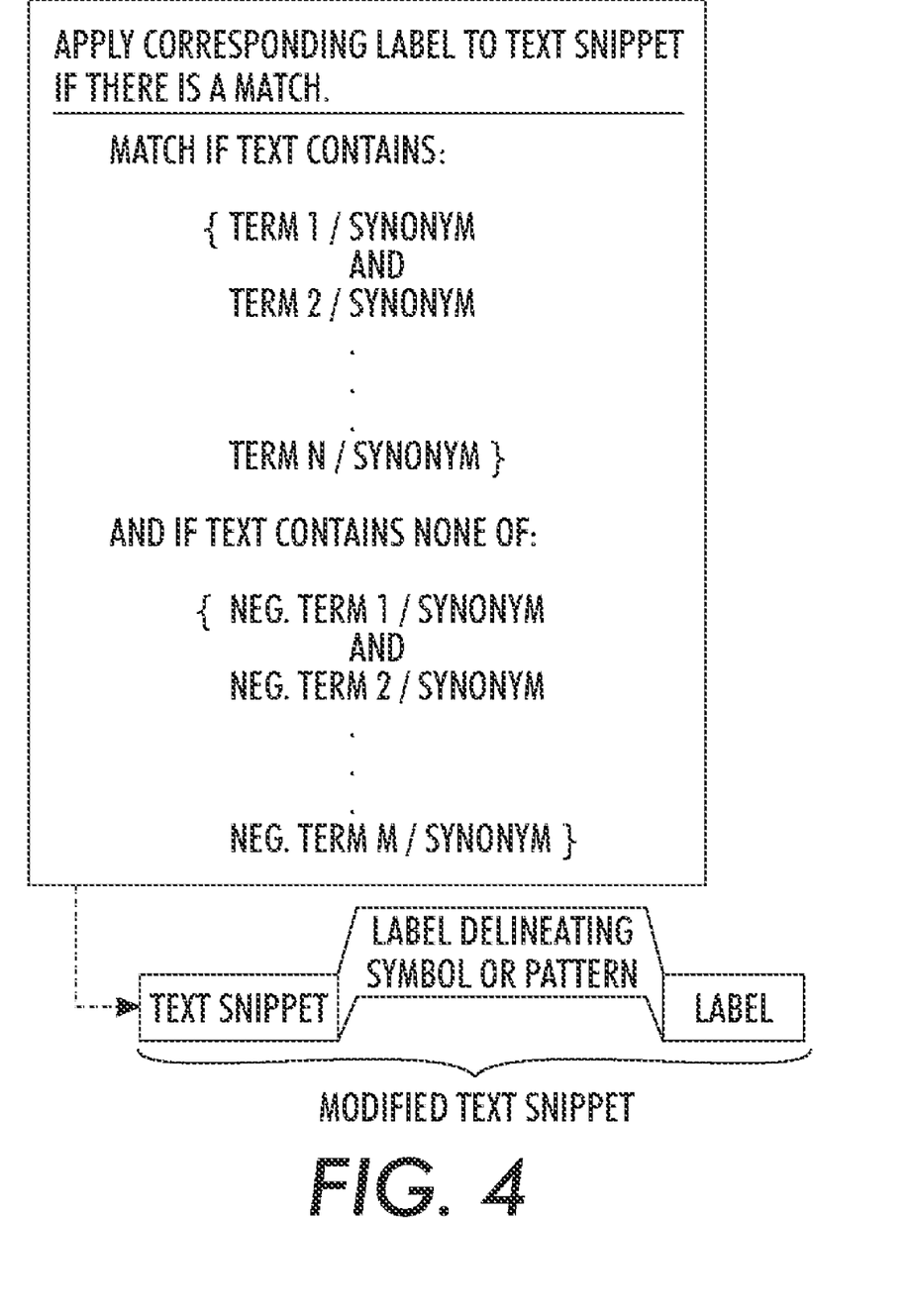
FIG. 4 is a schematic representation of how labels can be applied to a text snippet in accordance with the rules in a rule base.

As shown in FIG. 4, a corresponding label may be applied to a text snippet if there is a match. A match, in the example illustrated in FIG. 4, exists if the text snippet contains one of the terms in the match term set or one of the synonyms to any one of those terms, and if the text snippet contains none of the negation terms in the negation term set, nor the synonyms of those negation terms. When a label is applied to or associated with the text snippet, the label may be added as part of the textual expression as shown towards the bottom of FIG. 4. That is, the label can be appended to the text snippet, separated from the text snippet by a label delineating symbol or pattern, to form a modified text snippet.

Figure 5:
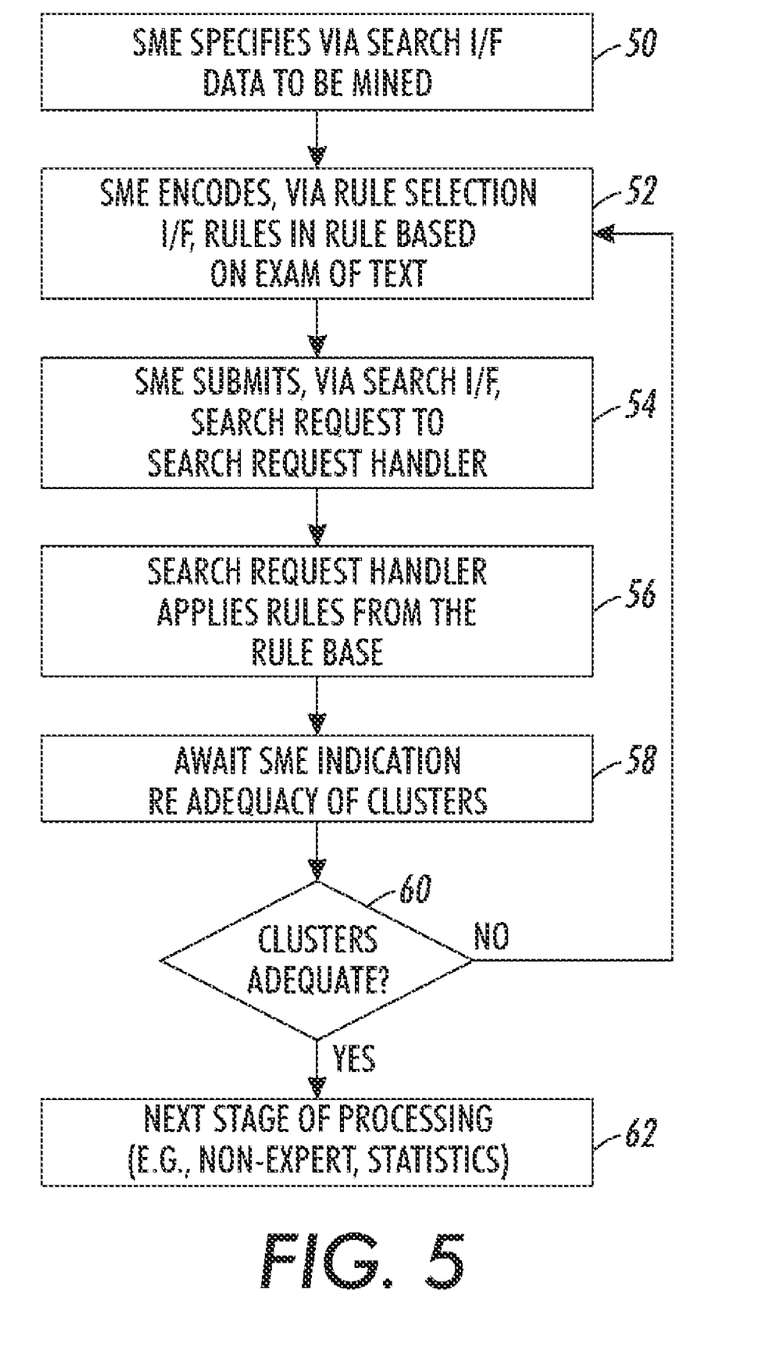
FIG. 5 is a flow chart of a process by which a subject matter expert may use the text analysis system shown in FIG. 1.

FIG. 5 is a flow chart of a process by which a subject matter expert (SME) may analyze textual data to be mined. In a first act 50, the subject matter expert specifies, via a search interface 15 (reference should be made to FIG. 1 for system elements referred to in this flow chart), data to be mined. In a next act 52, the subject matter expert encodes, via rule selection interface 16, rules in rule base 18 based on the subject matter expert's examination of the text. In act 54, the subject matter expert submits, via search interface 15, a search request to the search request handler 20 within search engine 12. In act 56, search request handler 20 applies the rules from the rule base 18. In act 58, search request handler 20 awaits an indication from the subject matter expert, via search interface 15, regarding the adequacy of the clusters presented to the subject matter expert via responses interface 17. If the subject matter expert chooses the option that the clusters presented are adequate, a determination is made at act 60 that causes the process to proceed to act 62. In act 62, the process performs the next stage of processing. For example, non-expert analyses may be performed, or statistical analyses may be performed either manually or with the use of automated processes.

If a determination is made at act 60 that the clusters are not adequate, the process returns to act 52, at which point the subject matter expert encodes, via rule selection interface 16, rules in rule base 18 based upon a further examination of the text.

Figure 6:
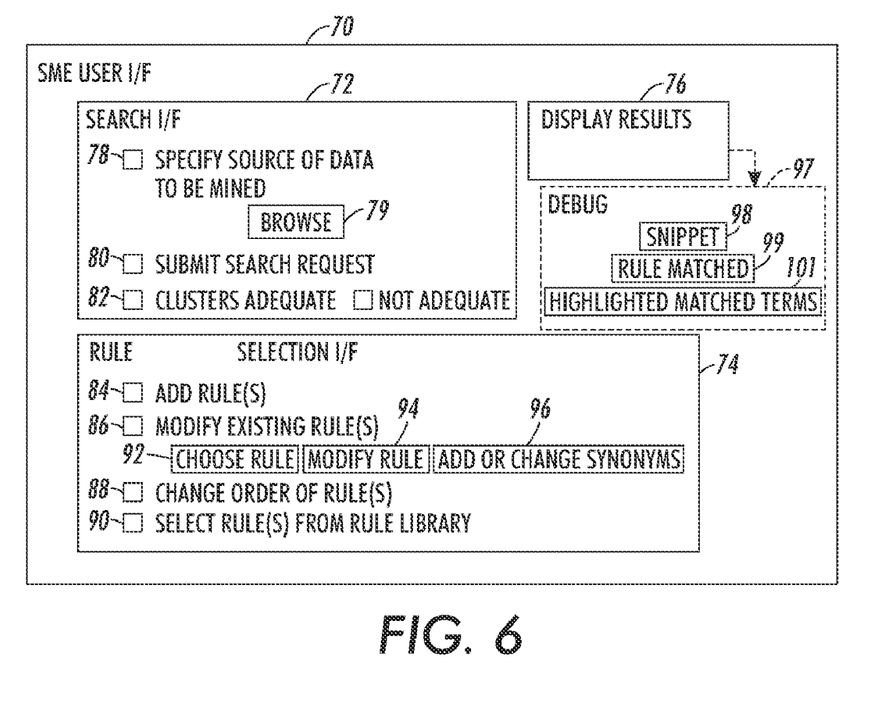
FIG. 6 is a schematic diagram of an example subject matter expert user interface.

FIG. 6 is a block diagram of an example subject matter expert user interface, which may be an implementation of user interface 10 shown in FIG. 1. The illustrated subject matter expert user interface 70 includes a search interface 72, a rules selection interface 74, and a results display 76. Results display 76 displays the results of the text search/analysis. Search interface 72 may include icons or otherwise manipulable graphical tools to allow the specification of the source of the data to be mined at 78, submission of a search request at 80, and an indication of whether clusters are adequate or non adequate at 82.

Rule selection interface 74 may provide icons for other graphical tools to allow a user, a subject matter expert in the illustrated embodiment, to add rules at 84, to modify existing rules at 86, to change the order of the rules at 88, and to select one or more rules from a rule library at 90. Should a user want to modify one or more existing rules, by using a graphical tool 86, additional graphical tools may be provided to allow the user to choose the rule at 92, to modify a given rule at 94, and to add or change synonyms at 96.

When specifying the source of data to be mined, a browse icon 79 may be provided which when clicked allows the user to use a browse function to choose a file containing the data to be mined.

The system illustrated in FIG. 1 may be provided with a debug tool, which causes display results 76 in the subject matter expert interface 70 shown in FIG. 6 to display debugging information 97. The illustrated debugging information 97 includes a snippet display 98 of a given snippet to which a label has been applied, a rule matched display 99 of a rule that was matched for the given snippet, and highlights 101 of the matched terms within the given snippet. Those highlights 101 may be, for example, highlighted text within the snippet display 98 or they may be a separate listing of the terms within the given snippet that were matched.

A graphical tool may include, for example, an icon or button that can be activated by clicking a mouse with a curser situated over the icon or button. A graphical tool may include a form or textual input represented on a computer screen. A graphical tool may include a menu of displayed symbols or text that could be chosen by pointing to and clicking over a given symbol or text. The graphical tool can also include a drop down menu, or any other type of graphical tool. Alternatively, other tools may be provided to allow a user to control and operate any of the functions referred to in the interface 70 shown in FIG. 6, e.g., with the use of a command line type interface.

Figure 7:
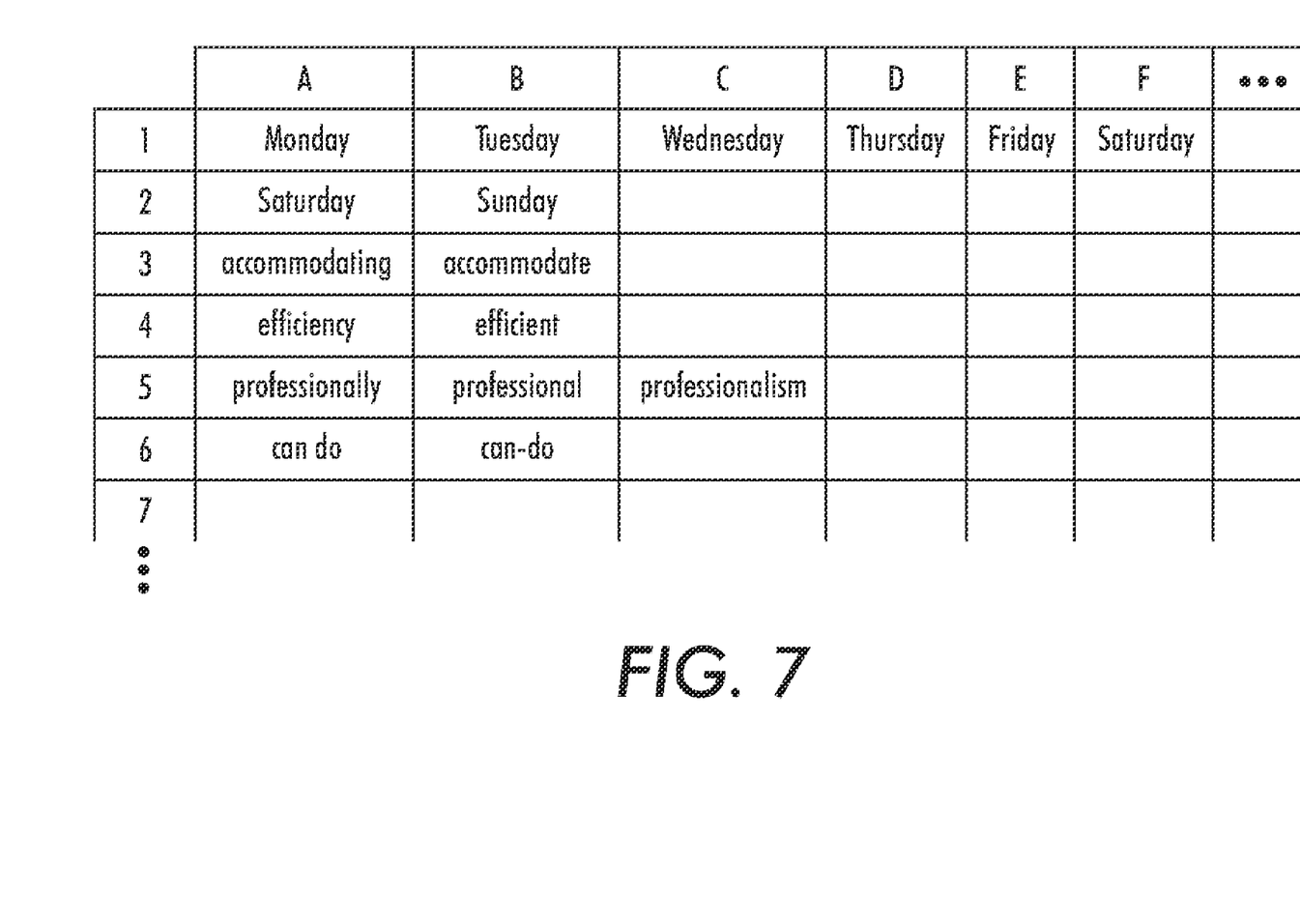
FIG. 7 is a schematic representation of a display of a synonym table.

FIG. 7 is an example of an interface that may be used to allow a user to define synonyms corresponding to terms numbered as terms 1, 2, 3, 4, 5, 6 (and so on). Each of the numbered terms has a set of synonyms, each synonym corresponding to a row under a heading of A, B, C, D, E, and so on. As illustrated in FIG. 7, the first term has synonyms Monday, Tuesday, Wednesday, Thursday, Friday, Saturday, and Sunday. These synonyms may correspond to a term "day of the week". A second term 2 has synonyms Saturday and Sunday. These synonyms may correspond to the term "weekend". A third term has synonyms accommodating and accommodate. The term corresponding to these synonyms may be "helpful". The synonyms corresponding to term 4 include efficiency and efficient. These synonyms may correspond to a term "cost-effective" or "fast". Additional synonyms included on the table shown in FIG. 7 include professionally, professional and professionalism, and the terms synonyms can do and can-do.

The table shown in FIG. 7 may be presented in a graphically displayed form to the user to allow the text to be input in each box of the table using the graphical user interface of the computer. Such a table may be presented by pulling up, for example, a spreadsheet (for example, EXCEL™), or by providing an interface presenting the table to the user.

Figure 8:
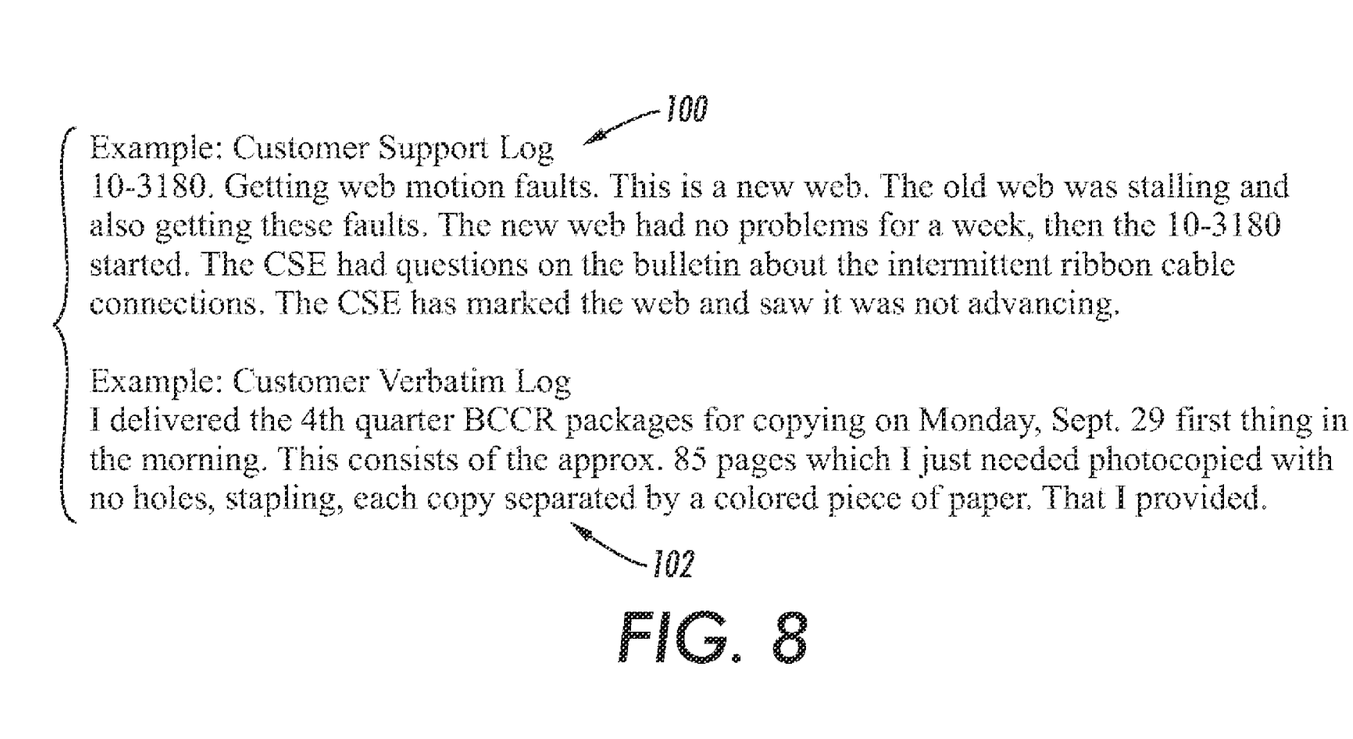
FIG. 8 illustrates examples of a customer request log entry text snippet and a field service log entry text snippet.

FIG. 8 provides examples of two different types of text snippets. A first text snippet 100 is an example of a customer request log entry. A second text snippet 102 is an example of a field service log entry.

An additional embodiment might involve a system for creating metrics to the guide the proper scheduling and assignment of engineering tasks, the system comprising a categorization system 9 as shown in FIG. 1. Another embodiment might involve a system for eliciting and analyzing customer verbatims.

A subject matter expert may use a text analysis system 9 such as that shown in FIG. 1 to encode his or her own knowledge. First, the expert could develop rules and provide them with rule base 18 to cluster a set of engineering logs, and then apply the same rules to a new set of logs. This would help ensure that the same criteria are used for multiple clustering of text logs. Second, an expert can revise the rules to provide a different cluster. In this way, the expert can explore the data providing different clusters.

In a statistical analysis system, the number of snippets in each cluster can be counted to provide statistics regarding the number of messages in each cluster. If the messages include service logs, this would provide a measure of the frequency of certain problems.

The rules in rule base 18 may be listed in a specified order. For example, the rules may be applied in order, so that rules are not applied to text snippets that already have a label. This way, the first rule that matches determines the category for that text snippet. This helps an expert ensure that more specific rules apply before less specific rules.

The rule base structure illustrated in FIG. 2 may be further revised. Synonym sets may be provided for use in automatically analyzing text data. A given synonym set can be designated by a distinguished mark, and that mark can be provided in a given rule. When applying that rule, the system reports a match when the term or any of the members of the synonym set appear in the rule. With the provision of synonym sets, the clauses are no longer in the disjunctive normal form (DMF). Instead, each conjunctive clause may contain a disjunctive clause in place of any element in the conjunctive clause. While the structure of rule base 18a shown in FIG. 2 can represent any Boolean expression, the language makes it easier to capture the description of words and phrases in a natural language.

A given term in a conjunctive clause in the structure of rule base 18a shown in FIG. 2, or a given tail in a rule in rule base 18b as shown in FIG. 3 may contain a complete word, part of a word, and/or a phrase. Synonyms may be generated by the user; using a displayed synonym table. Alternatively, an electronic thesaurus may be used to automatically generate a list of synonyms for terms.

The processing or functions performed by the elements shown in FIG. 1 may be performed by a general purpose computer and/or by a specialized processing computer. Such processing or functions may be performed by a single platform or by a distributed processing platform. In addition, such processing or functions can be implemented in the form of special purpose hardware or in the form of software run by a computer. Any data handled in such processing or created as a result of such processing can be stored in any type of memory. By way of example, such data may be stored in a temporary memory, such as in the RAM of a given computer. In addition, or in the alternative, such data may be stored in longer-term storage devices, for example, magnetic disks, rewritable optical disks, and so on. For the disclosure herein, a machine readable media comprise any form of data storage mechanism, including the above-noted different memory technologies as well as hardware or circuit representations of such structures and of such data.

The claims, as originally presented and as they may be amended, encompass variations, alternatives, modifications, improvements, equivalents, and substantial equivalents of the embodiments and the teachings disclosed herein, including those that are presently unforeseen or unappreciated, and that, for example, may arise from applicants/patentees, and others.

What is claimed is:

1. Machine-readable media encoded with data, the data being interoperable with a machine to cause:

accessing text data to be mined, the text data including text snippets;

encoding rules in a rule base, the encoding of a given one of the rules including a human user entering, via a computer screen displayed subject matter expert interface, freely typed text representing a given label and the encoding of the given one further including the human user entering, via a computer screen interface, freely typed text representing given synonyms, the given label and the given synonyms defining the given one of the rules at least in part;

submitting a search request to a search request handler;

the search request handler applying the rules from the rule base, including the given one, to the text data and automatically associating different labels to respective text snippets in the text data in accordance with the rule base;

displaying the text snippets and associated labels resulting from the application of the rules from the rule base on the subject matter expert interface; and after the search request handler has at least once applied the rules, presenting to the human user, on the computer screen displayed subject matter expert interface, a revise option that can be selected by the human user through the subject matter expert interface to indicate a need to further encode the rules in the rule base, and the human user choosing the revise option and entering, via the computer screen displayed subject matter expert interface, freely typed text to thereby revise both the given label and the given synonyms;

wherein the rule input by the human user includes information encoding a rule from among the rules in the rule base to include a label and synonyms including a corresponding set of match terms, where a mined text snippet containing a match term in the corresponding set of match terms is associated with the label.

2. The machine-readable media according to claim 1, the data being interoperable with a machine to further cause:

after presenting the human user with text snippets and their associated different labels, in response to the human user's selection of the revise option, further encoding further encoded rules in the rule base, the further encoded rules including one or both of modified versions of the rules and added rules.

3. The machine-readable media according to claim 2, the data being interoperable with a machine to further cause:

the encoding and the further encoding being in response to rule information input by the human user via the computer screen displayed subject matter expert interface.

4. The machine-readable media according to claim 3, the data being interoperable with a machine to further cause:

the encoding being in response to rule information input by a human user via the computer screen displayed subject matter expert interface, the rule information input by the human user via the subject matter expert interface including both the human user entering of the freely typed text representing the given label and the human user entering of the freely typed text representing the given synonyms; and the rule information input by the user including a textual language using a prescribed syntax, the textual language including a textual label separated from match terms and from negation terms with a prescribed symbol.

5. The machine-readable media according to claim 3, the data being interoperable with the machine to further cause:

a rule from among the rules in the rule base being encoded in response to input by the human user by the computer screen displayed subject matter expert interface to also include a corresponding set of negation terms, and where a mined text snippet containing at least one negation term in a given set of negation terms is not associated with the label corresponding to the given set of negation terms.

6. The machine-readable media according to claim 5, the data being interoperable with the machine to further cause:

a rule from among the rules in the rule base further including, for respective terms of the rule, corresponding sets of synonyms, and where a mined text snippet contains a term when it contains a string of characters matching the term's string of characters or a corresponding synonym's string of characters.

7. A method comprising:

accessing text data to be mined, the text data including text snippets;

encoding rules in a rule base, the encoding of a given one of the rules including a user entering, via a computer screen displayed subject matter expert interface, freely typed text representing a given label and the encoding of the given one further including the user entering, via the computer screen displayed subject matter expert interface, freely typed text representing given synonyms, the given label and the given synonyms defining the given one of the rules at least in part;

submitting a search request to a search request handler;

the search request handler applying the rules from the rule base to the text data and associating different labels to respective text snippets in the text data in accordance with the rule base;

displaying the text snippets and associated labels resulting from the application of the rules from the rule base on the subject matter expert interface; and after the search request handler has at least once applied the rules, presenting to the human user, on the computer screen displayed subject matter expert interface, a revise option that can be selected by the human user through the subject matter expert interface to indicate a need to further encode the rules in the rule base, and the human user choosing the revise option and entering, via the computer screen displayed subject matter expert interface, freely typed text to thereby revise both the given label and the given synonyms;

wherein the rule input by the human user includes information encoding a rule from among the rules in the rule base to include a label and synonyms including a corresponding set of match terms, where a mined text snippet containing a match term in the corresponding set of match terms is associated with the label.

8. The method according to claim 7, further comprising:

after presenting the human user with text snippets and their associated different labels, in response to the human user's selection of the revise option, further encoding rules in the rule base, the further encoded rules including one or both of modified versions of the rules and added rules.

9. The method according to claim 8, further comprising:

the encoding and the further encoding being in response to rule information input by the human user via the computer screen displayed subject matter expert interface.

10. The method according to claim 9, further comprising:

the encoding being in response to rule information input by the human user via a computer screen displayed rule selection interface forming part of the subject matter expert interface, the rule selection interface including graphical tools configured to allow the human user to add rules, and to select one or more rules from a rule library; and the rule information input by the user including a textual language using a prescribed syntax, the textual language including a textual label separated from match terms and from negation terms with a prescribed symbol.

11. The method according to claim 9, further comprising:
a rule from among the rules in the rule base being encoded in response to input by the human user by the computer screen displayed subject matter expert interface to also include a corresponding set of negation terms, and where a mined text snippet containing at least one negation term in a given set of negation terms is not associated with the label corresponding to the given set of negation terms.

12. The method according to claim 11, further comprising:
a rule from among the rules in the rule base further including for respective terms of the rule corresponding sets of synonyms, and where a mined text snippet contains a term when it contains a string of characters matching the term's string of characters or a corresponding synonym's string of characters.

13. Apparatus comprising:
a computer screen displaying a computer screen interface;
a search request handler to access text data to be mined, the text data including text snippets;
a rule base including rules;
a rule entering interface configured to receive a given one of the rules input by a human user, via a rules selection interface displayed on the computer screen, freely typing text representing a given label and further by the human user, via the computer screen interface, freely typing text representing given synonyms, the given label and the given synonyms defining the given one of the rules at least in part;
the rule selection interface to encode, via the human user interacting with the computer screen, the rules in the rule base;
a search interface to submit a search request to the search request handler; and
an execution mechanism to apply the rules from the rule base, including the given one, to the text data and to associate different labels to respective text snippets in the text data in accordance with the rule base;
a subject matter expert interface to display the text snippets and associated labels resulting from the application of the rules from the rule base; and
a new rule input mechanism preconfigured to present via the computer screen displayed rule selection interface, after the execution mechanism has at least once applied the rules, a revise option that can be selected by the human user through the subject matter expert interface to indicate a need to further encode the rules in the rule base, and to receive, upon the human user choosing the revise option, freely typed text to thereby revise both the given label and the given synonyms;
wherein a rule in the rule base includes a label and synonyms including a corresponding set of match terms, where, when the rule is executed by the execution mechanism, a mined text snippet containing at least one match term in the given set of match terms is associated with the label corresponding to the given set of match terms.

14. The apparatus according to claim 13, further comprising:
a results display to present to the human user, on the computer screen display, text snippets and their associated different labels.

15. The apparatus according to claim 14, further comprising:
a rule modification interface to modify rules in the rule base and to add rules to the rule base.

16. The apparatus according to claim 15, wherein:
the rules stored in the rule base include textual language using a prescribed syntax, the textual language including a textual label separated from match terms and from negation terms with a prescribed symbol.

17. The apparatus according to claim 15, wherein:
the rule in the rule base also includes a corresponding set of negation terms, and where, when the rule is executed by the execution mechanism, a mined text snippet containing at least one negation term in a given set of negation terms is not associated with the label corresponding to the given set of negation terms.

18. The machine-readable media according to claim 1, the data being interoperable with a machine to further cause:
presenting to the human user, via the computer screen displayed subject matter expert user interface, a cluster adequacy indication graphical tool;
the search request handler awaiting a cluster adequacy indication input by the human user, via the cluster adequacy indication graphical tool on the computer screen displayed subject matter expert interface, regarding whether given clusters, resulting from the search request handler having applied the rules from the rule base to a given set of mined text data, are adequate, and, when the awaited cluster adequacy indication graphical tool by the human user is that the given clusters are adequate, the search request handler subsequently performing a post-search analysis on the given set of mined text data, and, when the awaited cluster adequacy indication is that the given clusters are inadequate, subsequently receiving, from the human user via the computer screen displayed subject matter expert user interface, additional rule encoding information for the given set of mined text data and requesting the search request handler to search the given set of mined text data using the additional rule encoding information.

19. The machine-readable media according to claim 18, the data being interoperable with a machine to further cause:
the cluster adequacy indication to be received from a subject matter expert input displayed on the computer screen and interacted with by the human user.

20. The machine-readable media according to claim 18, the data being interoperable with a machine to further cause:
the cluster adequacy indication to be received from the human user via a computer screen displayed search interface forming part of the subject matter expert interface.

21. The machine-readable media according to claim 18, the data being interoperable with a machine to further cause:
presenting to the human user via the computer screen displayed subject matter expert user interface the cluster adequacy graphical tool, the cluster adequacy graphical tool being configured to receive, via the computer screen displayed interface, one of adequate and not adequate inputs from the human user, thereby causing the cluster adequacy indication awaited by the search request handler.

* * * * *